US012766459B2

(12) United States Patent
Stallmann et al.

(10) Patent No.: US 12,766,459 B2
(45) Date of Patent: Oct. 20, 2026

(54) AMMONIA-BASED CARBON DIOXIDE ABATEMENT SYSTEM AND METHOD, AND DIRECT CONTACT COOLER THEREFORE

(71) Applicant: NUOVO PIGNONE TECNOLOGIE—S.R.L., Florence (IT)

(72) Inventors: Olaf Stallmann, Frankfurt (DE); Schnoor Birger, Frankfurt (DE)

(73) Assignee: Nuovo Pignone Tecnologie—S.R.L., Florence (IT)

( * ) Notice: Subject to any disclaimer, the term of this patent is extended or adjusted under 35 U.S.C. 154(b) by 746 days.

(21) Appl. No.: 18/042,402

(22) PCT Filed: Aug. 18, 2021

(86) PCT No.: PCT/EP2021/025313
§ 371 (c)(1),
(2) Date: Feb. 21, 2023

(87) PCT Pub. No.: WO2022/042881
PCT Pub. Date: Mar. 3, 2022

(65) Prior Publication Data

US 2023/0356143 A1 Nov. 9, 2023

(30) Foreign Application Priority Data

Aug. 26, 2020 (IT) ........................ 102020000020473

(51) Int. Cl.

| | |
|---|---|
| ***B01D 53/00*** | (2006.01) |
| ***B01D 53/14*** | (2006.01) |
| ***B01D 53/62*** | (2006.01) |

(52) U.S. Cl.
CPC ......... *B01D 53/1475* (2013.01); *B01D 53/62* (2013.01); *B01D 2252/102* (2013.01);
(Continued)

(58) Field of Classification Search
CPC ................ B01D 53/1475; B01D 53/62; B01D 2252/102; B01D 2252/103;
(Continued)

(56) References Cited

U.S. PATENT DOCUMENTS

| | | | |
|---|---|---|---|
| 4,847,057 | A | 7/1989 | Brugerolle et al. |
| 2008/0072762 | A1 | 3/2008 | Gal |

(Continued)

FOREIGN PATENT DOCUMENTS

| | | | |
|---|---|---|---|
| EP | 0885843 | A1 | 12/1998 |

*Primary Examiner* — T. Bennett Mckenzie
(74) *Attorney, Agent, or Firm* — Paul Frank + Collins P.C.

(57) ABSTRACT

A direct contact cooler comprises a flue gas stream path extending from a flue gas inlet to a flue gas outlet. The direct contact cooler further includes a first treatment section and a second treatment section disposed along the flue gas stream path. The first treatment section is arranged upstream of the second treatment section with respect to a flue gas stream along the flue gas stream path. The direct contact cooler includes an ammonia-rich wash water inlet and an ammonia-lean wash water outlet. The ammonia-rich wash water inlet is disposed between the first treatment section and the second treatment section and the ammonia-lean wash water outlet is disposed upstream of the first treatment section. Also disclosed herein are an ammonia-based carbon dioxide removal system including a direct contact cooler as defined above and a relevant method for carbon dioxide abatement.

17 Claims, 3 Drawing Sheets

(52) U.S. Cl.
CPC .. *B01D 2252/103* (2013.01); *B01D 2257/302* (2013.01); *B01D 2257/504* (2013.01); *B01D 2258/0283* (2013.01)

(58) Field of Classification Search
CPC ........ B01D 2257/302; B01D 2257/504; B01D 2258/0283; B01D 2257/406; Y02A 50/20; Y02C 20/40
USPC ............................... 96/242–371; 95/149–240
See application file for complete search history.

(56) References Cited

U.S. PATENT DOCUMENTS

| | | | | |
|---|---|---|---|---|
| 2013/0042759 | A1* | 2/2013 | Koss | B01D 53/78<br>95/199 |
| 2018/0169569 | A1* | 6/2018 | Dube | F28C 1/003 |

* cited by examiner

AMMONIA-BASED CARBON DIOXIDE ABATEMENT SYSTEM AND METHOD, AND DIRECT CONTACT COOLER THEREFORE

TECHNICAL FIELD

Embodiments of the invention relate generally to technologies for reducing carbon dioxide emissions from flue gas or other sources of carbon dioxide, and more specifically to systems and methods for ammonia-based carbon dioxide abatement, i.e. for removing carbon dioxide from flue gas.

BACKGROUND ART

Most of the energy used in the world is derived from combustion of carbon and hydrogen containing fuels such as coal, oil and natural gas (fossil fuels). In addition to carbon and hydrogen, these fuels contain oxygen, moisture and contaminants such as ash, sulfur (often in the form of sulfur oxides, referred to as SON), nitrogen compounds (often in the form of nitrogen oxides, referred to as NOR), chlorine, mercury and other trace elements.

Awareness regarding the damaging effects of contaminants released in the atmosphere during combustion triggered the enforcement of increasingly more stringent limits on emissions from power plants, refineries and other industrial processes. There is an increased pressure on operators of such plant to achieve near zero emission of contaminants.

In the combustion of fuel, such as e.g. coal, oil, peat, waste, biofuel, natural gas or the like, used for the power generation or for the production of materials such as cement, steel and glass, and the like, a stream of hot flue gas is generated. The hot flue gas contains, among other pollutants, large amounts of carbon dioxide ($CO_2$), which is responsible for the so-called greenhouse effect and related global temperature increase.

Numerous systems and processes have been developed aimed at reducing the emission of contaminants. These systems and processes include, but are not limited, to desulfurization systems, particulate filters, as well as use of one or more sorbents that absorb contaminants from the flue gas. Examples of sorbents include, but are not limited to, activated carbon, ammonia, limestone and the like.

It has been shown that ammonia efficiently removes carbon dioxide as well as other contaminants, such as sulfur dioxide and hydrogen chloride, from flue gas streams. In one particular application, absorption and removal of carbon dioxide from a flue gas stream with ammonia is conducted at low temperature, for example between 0 and 20° C. These systems are based on a so-called Chilled Ammonia Process (shortly CAP). To safeguard the efficiency of the system and to comply with emission standards, maintenance of the ammonia within the flue gas stream treatment system is desired, i.e. no ammonia shall be released in the atmosphere.

In CAP systems of the current art, after $CO_2$ has been removed from the flue gas stream in a carbon dioxide absorber, the flue gas contains a major amount of ammonia that is emanating from the solvent used in the carbon dioxide absorber. To limit ammonia losses the CAP technology features a so-called ammonia washing section ($NH_3$ wash), also referred to as water wash station. The water wash station or $NH_3$ wash section includes a packed bed column, where the flue gas is directly contacted with a water stream. To enhance performance of the $NH_3$ removal from the flue gas, the water stream may be prior conditioned in pH using a suitable acid, like sulfuric acid. The ammonia-rich water exiting the $NH_3$ wash is then regenerated in a dedicated column system, the stripper column, where water and ammonia are separated. The water is routed to a direct contact heater, the ammonia is recycled back to the carbon dioxide absorber.

The direct contact heater is another column that heats the flue gas flowing out of the $NH_3$ wash. This has two effects: generation of a cold-water stream that is used in the direct contact cooler; and heating of the flue gas to the minimum temperature required for the dispersion thereof at the stack. The water fed to the direct contact heater is coming from the direct contact cooler.

Moisture in the flue gas can accumulate in the ionic solution as it circulates between the $CO_2$ capture system and the regeneration system. In order to remove this moisture from the ionic solution, an appendix stripper configured as a gas-liquid contacting device, receives a portion of the circulating ionic solution. In this device, warm ionic solution is depressurized to form a gas phase containing the vapor of low boiling point components of the solution (primarily ammonia and carbon dioxide), and a liquid phase containing the high boiling point components of the solution. A portion of the gas phase compound is absorbed in the residual flue gas stripping medium and returned to the chilled ammonia process absorber vessels. The liquid phase containing the ammonium sulfate is sent to the direct contact cooler system for purge with the ammonium sulfate bleed stream.

The current state-of-the-art CAP requires a considerable amount of steam for operation of the stripper system.

Similar issues arise in other ammonia-based $CO_2$ abatement or capturing systems and methods, for instance in systems using ammonia and potassium carbonate or potassium hydroxide.

Several efforts and investigations were made to reduce this steam demand. One of the most promising ideas was to use the incoming flue gas as a stripping agent. In other fields of application ammonia abatement strategies were developed (see for example: EP 0 885 843 A1). These are considered to build the background for the basic idea, as outlined also in the article "Process Modeling of an Advanced $NH_3$ Abatement and Recycling Technology in the Ammonia-Based $CO_2$ Capture Process" by Kangkang Li, Hai Yu, Moses Tade, Paul Feron, Jingwen Yu and Shujuan Wang. The authors simply transferred the phosphate-based principle of the background to a carbonate-based reaction system. Nevertheless, the authors did not solve the problems associated with processing a real flue gas stream. As the flue gas from combustion processes usually contains, despite nitrogen, carbon dioxide and oxygen, also water plus trace components like sulfur oxides, nitrous oxides and solid matter, a functional method and system have to cover the management of all of these species.

An enhanced plant and method for CAP-based carbon dioxide removal is disclosed for instance in US2018/0169569, the content whereof is incorporated herein by reference.

The current CAP technology is still open to further developments to achieve improved efficiency, for instance in terms of energy consumption and efficient handling of materials involved in the process.

SUMMARY

According to one aspect, a direct contact cooler for an ammonia-based carbon dioxide abatement system is disclosed herein. The direct contact cooler comprises a flue gas stream path extending from a flue gas inlet to a flue gas outlet. The direct contact cooler further includes a first treatment section and a second treatment section disposed along the flue gas stream path. The first treatment section is adapted to strip ammonia from an ammonia-rich wash water stream by means of the flue gas stream such that ammonia is removed from the ammonia-rich wash water stream and drawn by the flue gas in the next, second treatment section.

The second treatment section is adapted to cool the ammonia-rich flue gas stream exiting the first treatment section, such that chilled ammonia-rich flue gas at the correct temperature for carbon dioxide removal is obtained at the outlet of the direct contact cooler.

The first treatment section is arranged upstream of the second treatment section with respect to a flue gas stream along the flue gas stream path. Moreover, the direct contact cooler includes an ammonia-rich wash water inlet and an ammonia-lean wash water outlet. The ammonia-rich wash water inlet is disposed between the first treatment section and the second treatment section. Moreover, the ammonia-lean wash water outlet is disposed upstream of the first treatment section.

With respect to the current art direct contact coolers, therefore, according to the novel direct contact cooler disclosed herein, the treatment sections are arranged such that ammonia is stripped from the wash water at a higher temperature and the flue gas is cooled at a suitable temperature for subsequent carbon dioxide removal when it has been loaded with ammonia by stripping.

When the direct contact cooler is arranged in an ammonia-based carbon dioxide abatement system, a particularly efficient process for carbon dioxide removal is obtained. In embodiments disclosed herein, a reduction of the required thermal energy is achieved, for instance.

According to a further aspect, an ammonia-based carbon dioxide abatement system is disclosed herein. The system comprises a direct contact cooler as outlined above, and other units such as in particular a carbon dioxide absorber disposed downstream of and fluidly coupled to the direct contact cooler and having a flue gas inlet and a flue gas outlet. In embodiments disclosed herein, the carbon dioxide absorber is adapted to absorb gaseous carbon dioxide from flue gas entering the carbon dioxide absorber from the direct contact cooler via an ammonia-based solution, to form a $CO_2$-rich ammonia-based solution exiting the absorber through a carbon dioxide outlet. The system can further include a water wash station fluidly coupled through a flue gas inlet to the carbon dioxide absorber, and adapted to absorb the ammonia slip from the flue gas.

According to yet a further aspect, disclosed herein is a method for carbon dioxide abatement, i.e. carbon dioxide removal, using an ammonia-based system.

According to embodiments disclosed herein, the carbon dioxide abatement process comprises the following steps:

- flowing a $CO_2$-rich flue gas stream in countercurrent with a flow of an ammonia-rich wash water stream and stripping ammonia from the ammonia-rich wash water stream therewith, to obtain a $CO_2$-rich, ammonia-rich flue gas stream;
- chilling the $CO_2$-rich, ammonia-rich flue gas stream by direct contact cooling with a chilled water stream to achieve a flue gas temperature adapted for carbon dioxide removal;
- flowing the chilled $CO_2$-rich, ammonia-rich flue gas stream through a carbon dioxide absorber and contacting the chilled $CO_2$-rich, ammonia-rich flue gas stream with an ammonia-based solution to absorb carbon dioxide therefrom and produce a $CO_2$-rich ammonia-based solution and obtaining a $CO_2$-lean, ammonia-lean flue gas stream;
- removing carbon dioxide from the $CO_2$-rich ammonia-based solution.

Further embodiments and features of the direct contact cooler, of the carbon dioxide abatement system and of the method for carbon dioxide removal according to the present disclosure are outlined in the following detailed description and are set forth in the attached claims, which form an integral part of the present description.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

Disclosed herein are improvements to systems for removing or abating carbon dioxide contained in a flow of flue gas, using an ammonia-based technology. To improve the overall efficiency of the system, a novel direct contact cooler is disclosed, through which flue gas flows prior to be processed in an absorber. The direct contact cooler includes a first section, wherein carbon dioxide rich flue gas and a flow of ammonia-reach wash water flow in direct contact with each other, such that the incoming hot flow gas strips ammonia from the wash water flow. The direct contact cooler further includes a cooling section, where the ammonia-enriched flue gas is cooled in direct contact with a flow of chilled water.

Also disclosed herein are an ammonia-based carbon dioxide removal or abatement system, including the aforementioned direct contact cooler, as well as a carbon dioxide removal or abatement method. A more efficient carbon dioxide removal process is obtained, with a simpler circuit layout, more accurate water balance and reduced thermal energy consumption.

Figure 1:
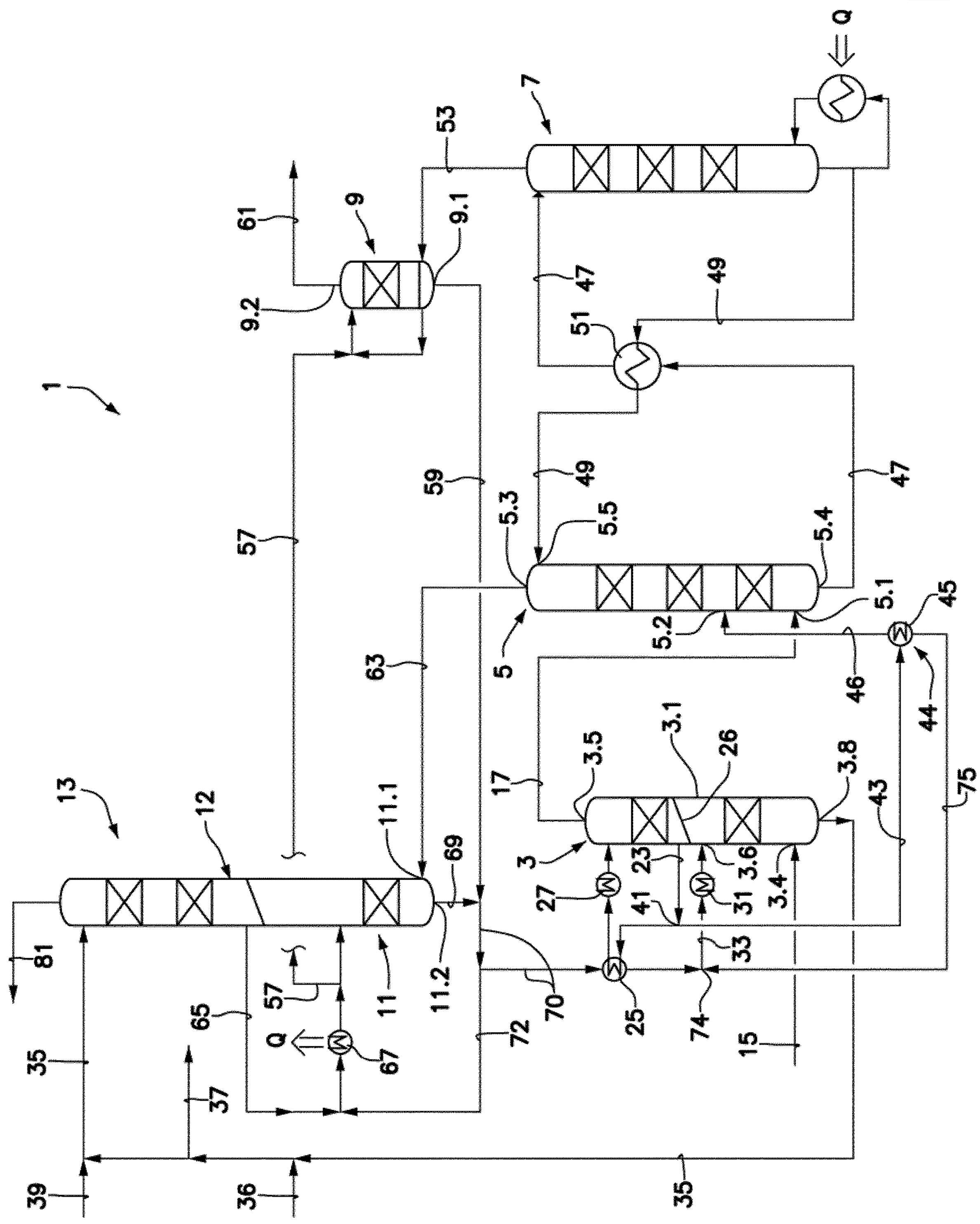
FIG. 1 is a schematic diagram of an ammonia-based carbon dioxide removal system according to the present disclosure using a chilled ammonia process (CAP)

A schematic diagram of an ammonia-based $CO_2$ capturing or abatement system 1 according to embodiments of the present disclosure is shown in FIG. 1. The embodiment of FIG. 1 is based on a Chilled Ammonia Process (CAP). However, those skilled in the art will understand that several novel features of the present disclosure can be embodied in other ammonia-based $CO_2$ capturing or abatement systems, achieving similar advantages.

The system 1 comprises a direct contact cooler 3, wherein an incoming $CO_2$-rich flue gas stream is loaded with ammonia and cooled prior to be fed to a carbon dioxide absorber 5 fluidly coupled to the direct contact cooler 3. In the carbon dioxide absorber 5, $CO_2$ contained in the flue gas is removed from the flue gas by absorption through an ammonia water solution. Ammonia-rich and $CO_2$-lean flue gas exits the carbon dioxide absorber 5 at the top and $CO_2$-rich ammonia water solution is collected at the bottom of the absorber 5.

Carbon dioxide is removed from the $CO_2$-rich ammonia water solution collected at the bottom of the absorber 5 in a regenerator 7 fluidly coupled to the carbon dioxide absorber 5. A $CO_2$ wash station 9 is fluidly coupled through a carbon dioxide inlet 9.1 to the regenerator 7 and receives carbon dioxide from the regenerator 7 to remove residual ammonia therefrom, prior to discharging the carbon dioxide from the system through a carbon dioxide outlet 9.2.

The $CO_2$-lean, ammonia-rich flue gas exiting at the top of the carbon dioxide absorber 5 is delivered to a water wash station 11 (or $NH_3$ wash station), where the major part of the ammonia contained in the flue gas is removed by flowing the flue gas stream through the water wash station 11 in countercurrent with an ammonia-lean wash water from a direct contact heater 13. The $CO_2$-lean, ammonia-lean flue gas stream is then delivered to the direct contact heater 13 and finally discharged in the atmosphere.

An ammonia-rich water stream is collected at the outlet of the water wash station 11 and delivered to the direct contact cooler 3, as described in more detail herein below.

In the embodiment of FIG. 1, the direct contact heater 13 and the water wash station 11 are combined in a single column 12, in which the direct contact heater 13 is arranged in the upper section of the column 12 and the water wash station 11 is arranged in the lower section of the column 12. This arrangement is particularly advantageous, for instance from the point of view of compactness and simplicity.

However, in other embodiments, not shown, the water wash station 11 and the direct contact heater 13 can be configured as separate circuit components fluidly coupled to one another.

As will be understood from the following description, the system 1 may include additional equipment as needed, according to requirements of the specific CAP or other process performed therein. Equipment known in the art and not necessary for a full understanding of the present disclosure is not shown and is not specifically described.

In general terms, a hot flue gas stream flows through the direct contact cooler 3 in counter-current with a flow of liquid coolant (chilled water), and with a flow of ammoniated washing solution (ammonia-rich water solution). The ammonia-rich washing solution is received from the direct contact heater 13, from the water wash station 11 and from the $CO_2$ wash station 9, as will be describe in more detail below.

Ammonia will be stripped by the flue gas from the washing solution and the flow of ammonia-loaded flue gas will flow through the carbon dioxide absorber 5, in counterflow with a flow of $CO_2$-lean ammonia-based solution from the regenerator 7. $CO_2$ is removed from the $CO_2$-rich, ammonia-rich flue gas in the carbon dioxide absorber 5 by the ammonia-based solution and a $CO_2$-rich, ammonia-based solution collected at the bottom of the carbon dioxide absorber 5 is delivered to the regenerator 7. Ammonia and $CO_2$ are separated in an endothermic regeneration process, whereby ammonia is returned to the carbon dioxide absorber 5 and $CO_2$ is delivered to the $CO_2$ wash station 9 for further removal of residual ammonia therefrom, as mentioned above.

In the water wash station 11 ammonia still contained in the $CO_2$-lean and ammonia-lean flue gas stream is further recovered prior to flowing the $CO_2$-lean and ammonia-lean flue gas stream through the direct contact heater 13, where the flue gas is heated by direct contact with a heating fluid before being discharged in the atmosphere. Removal of residual ammonia from the $CO_2$-lean and ammonia-lean flue gas stream is obtained by flowing the flue gas stream in counter-current with ammonia-lean wash water from the direct contact heater 13.

As a result of the above summarized process, carbon dioxide is removed from the flue gas on top of the $CO_2$ wash station 9 and collected and stored, or used in a suitable chemical process, thus reducing $CO_2$ emission from flue gas, which is released in the environment from the direct contact heater 13.

Figure 2:
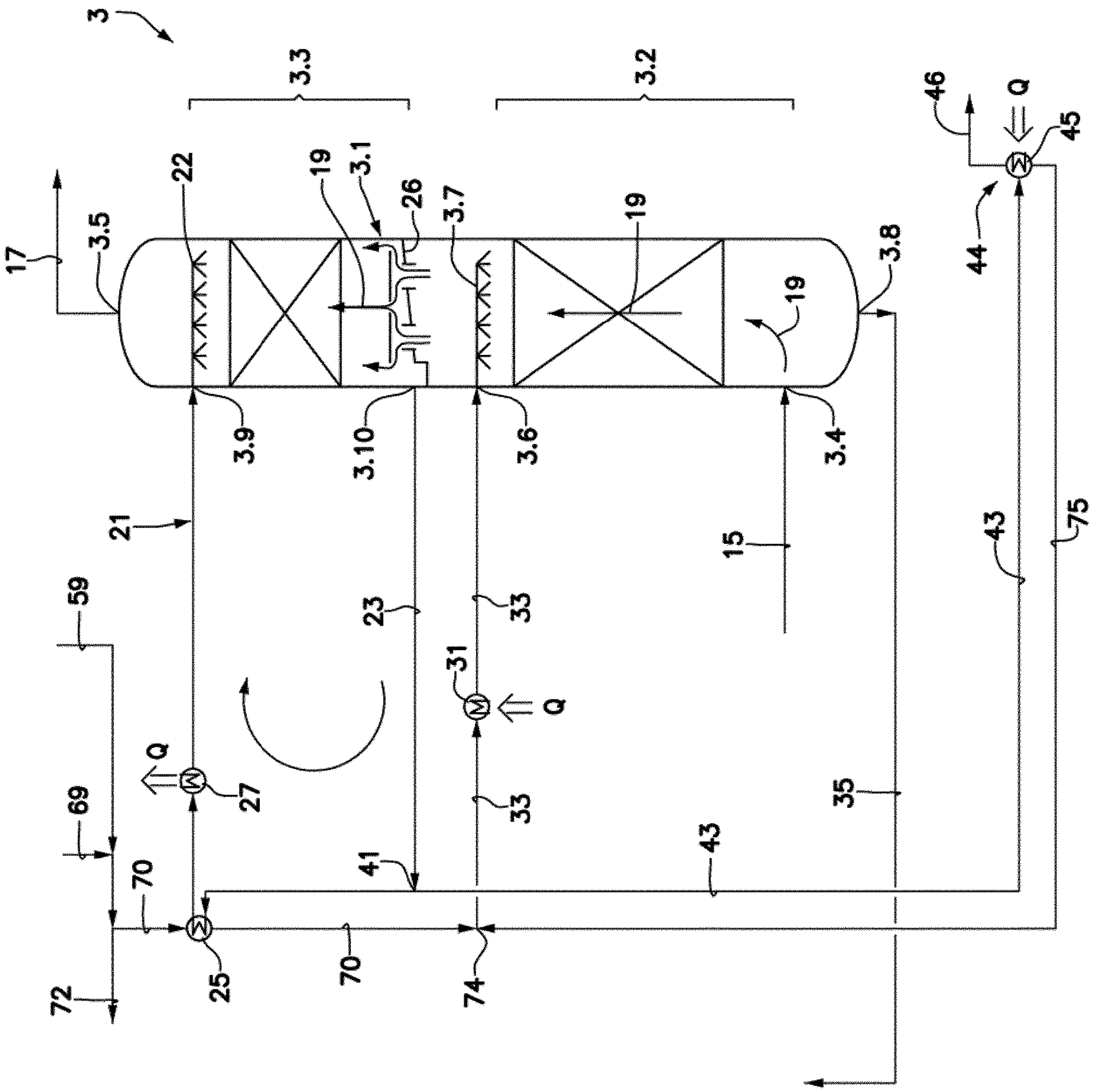
FIG. 2 is an enlargement of the direct contact cooler of the system of FIG. 1.

Going now in more detail, the direct contact cooler 3 comprises a casing 3.1 forming a column with a plurality of inlets and outlets, to be described. A more detailed representation of the direct contact cooler 3 is shown in FIG. 2. The direct contact cooler 3 comprises a first treatment section 3.2 and a second treatment section 3.3 (see in particular FIG. 2). The first treatment section 3.2 will be referred to also as stripping section, and the second treatment section 3.3 will be referred to also as cooling section, for the reasons which will become apparent herein after. Arranging the two sections one on top of the other is particularly advantageous, in particular since this allows easy circulation of the flue gas through the two sections. However, arranging the sections side-by-side is not excluded in principle.

The direct contact cooler 3 further includes a first inlet 3.4, adapted to receive a flue gas inlet flow. The first inlet 3.4 will be referred to herein also as flue gas inlet 3.4. The flue gas inlet 3.4 is fluidly coupled with a flue gas delivery conduit 15, through which flue gas to be treated enters the system 1.

The direct contact cooler 3 further includes a first outlet 3.5, referred to herein also as flue gas outlet 3.5. The flue gas outlet 3.5 is fluidly coupled through a duct 17 to the bottom of the carbon dioxide absorber 5. As disclosed in more detail below, an ammonia-rich and chilled flue gas stream flows through the first outlet 3.5 towards the carbon dioxide absorber 5. A fan, not shown, along duct 17 can promote flue gas circulation therein.

More specifically, the first inlet 3.4 and the first outlet 3.5 are arranged at the bottom of the direct contact cooler 3 and at the top of the direct contact cooler 3, respectively. The first inlet 3.4 is arranged under the first treatment section 3.2 (stripping section) and the first outlet 3.5 is arranged above the second treatment section 3.3 (cooling section).

A flue gas flow path 19 is thus defined in the direct contact cooler 3, extending in a downwards-upwards direction from the first inlet 3.4 to the first outlet 3.5. The flue gas flow path 19 extends through the first treatment section 3.2 and through the second treatment section 3.3 in sequence, the first treatment section 3.2 being arranged upstream of the second treatment section 3.3 with respect to the flow direction of the flue gas from the first inlet 3.4 to the first outlet 3.5.

As mentioned above, the direct contact cooler 3 performs two functions. Firstly, the flue gas entering the direct contact cooler 3 through flue gas inlet 3.4 flows in counter-current, i.e. in counter flow, with an ammonia-rich wash water stream, to strip ammonia therefrom. The ammonia-rich flue gas flows through flue gas outlet 3.5 into duct 17 and towards the carbon dioxide absorber 5. Secondly, the flue gas which enters the direct contact cooler 3 at high temperature, for instance around or above 70° C., is cooled in direct contact heat exchange relationship with a coolant fluid, specifically circulating chilled water. The cooled, ammonia-rich flue gas leaving the direct contact cooler 3 has a temperature of about 5-10° C., for instance, which is adapted to perform carbon dioxide removal in the carbon dioxide absorber 5.

Advantageously, ammonia stripping from the ammonia-rich wash water is performed in the first treatment section 3.2, upstream of the second treatment section 3.3, where the flue gas is cooled prior to exiting the direct contact cooler 3.

The direct contact cooler 3 comprises a second inlet 3.6, adapted to deliver therein an ammonia-rich wash water stream. The second inlet 3.6 will be referred to herein after also as ammonia-rich wash water inlet 3.6. Nozzles 3.7 can be fluidly coupled to the second inlet 3.6 to receive ammonia-rich wash water and can be adapted to spray the ammonia-rich wash water in counter-flow in the flue gas stream flowing in an upwards direction through the first treatment section 3.2. As shown in FIG. 2, the second inlet 3.6 and the nozzles 3.7 are arranged between the first treatment section 3.2 and the second treatment section 3.3.

As will be clarified herein after and as can be seen in FIG. 1, the ammonia-rich wash water flow is delivered by the water wash station 11 and by the carbon dioxide wash station 9.

The direct contact cooler 3 further includes a second outlet 3.8 at the bottom thereof, wherefrom stripped (ammonia-lean) and heated wash water is removed from the direct contact cooler 3 and returned to the direct contact heater 13. The second outlet 3.8 will be referred to also as ammonia-lean wash water outlet 3.8. The water exiting the direct contact cooler 3 at 3.8 is ammonia-lean wash water, i.e. a stream of wash water containing a low amount of ammonia, as the most part of the ammonia content has been stripped by the flue gas stream and flows therewith towards the second treatment section 3.3 of the direct contact cooler 3.

The direct contact cooler 3 further includes a third inlet 3.9 and a third outlet 3.10, also referred to as chilled water inlet 3.9 and chilled water outlet 3.10. More specifically, the chilled water inlet 3.9 is positioned in the upper part of the second treatment section 3.3 and the chilled water outlet 10 is positioned in the lower part of the second treatment section 3.3. Chilled water circulates in a cooling circuit 21, including the chilled water inlet 3.9, nozzles 22 fluidly coupled to the chilled water inlet 3.9, the second treatment section 3.3 of the direct contact cooler 3, the chilled water outlet 3.10 and a circulating duct 23.

Along the circulating duct 23 a heat exchanger 25 and a refrigerant driven chiller 27 are positioned. In the heat exchanger 25 the chilled water is partly cooled by heat exchange against ammonia-rich wash water from water wash station 11 and carbon dioxide wash station 9. In the chiller 27 water circulating in the cooling circuit 21 is further chilled by heat exchange against a refrigeration medium.

Thus, chilled water enters the direct contact cooler 3 through the third inlet 3.9 and is sprayed in counter-current in the ammonia-rich flue gas stream flowing through the second treatment section 3.3. Water heated by heat removed from the ammonia-rich flue gas collects at a chilled water collection device 26 arranged between the first treatment section 3.2 and the second treatment section 3.3. The chilled water collection device 26 can include a chimney tray or another similar device allowing the ammonia-rich flue gas to flow upwards therethrough and heated chilled water to be collected and delivered to the third outlet 3.10.

As a result of the heat exchange in the second treatment section 3.3 of the direct contact cooler 3 the ammonia-rich flue gas temperature is lowered to the value required for carbon dioxide recovery by absorption in the carbon dioxide absorber 5.

Heat removed from the ammonia-rich flue gas stream through the second treatment section 3.3 of the direct contact cooler 3 is used to pre-heat the ammonia-rich wash water delivered, through the ammonia-rich wash water inlet 3.6 and through the nozzles 3.7, to the first treatment section 3.2. If the ammonia-rich wash water exiting the heat exchanger 25 has not achieved the desired temperature, a further heater 31 can be provided along a conduit 33, leading to the ammonia-rich wash water inlet 3.6.

As mentioned above, wet and hot flue gas entering the direct contact heater 3 through the first inlet 3.4 is brought in contact with the preheated ammonia-rich and de-carbonized water stream in the first treatment section 3.2 of the direct contact cooler 3. The temperature of the ammonia-rich, pre-heated wash water in conduit 33 is selected such that the ammonia stripping effect performed by the flue gas in the first treatment section 3.2 of the direct contact cooler 3 is maximized and condensation of water contained in the incoming flue gas is limited. For this purpose, the water is preferably heated through heat exchanger 25 and heater 31, close to the flue gas dew point temperature.

In the first treatment section 3.2 of the direct contact cooler 3 also a removal of salt-forming sulfur oxides SOx and halogenides can take place. This can further decrease the amount of free ammonia present in the water collected at the bottom of the direct contact cooler 3 and removed through the second outlet (water outlet) 3.8. The ammonia-lean wash water stream exiting the direct contact cooler 3 at the second outlet 3.8 is delivered through a conduit 35 to the direct contact heater 13.

Prior to reaching the direct contact heater 13, the pH of the ammonia-lean water is adjusted (at 36, FIG. 1) by adding a suitable acid, to allow disposal of surplus water that was added to the cycle before, as well as disposal of accumulated ammonium sulfate resulting from removal of SOx from the flue gas in the direct contact cooler 3.

SOx can be removed from the flue gas as follows. SOx combines with ammonia in the second treatment section 3.3 and resulting ammonium sulfate will be soluted in the condensate from the second treatment section 3.3. In a separator 44, to be described, ammonium sulfate will remain in the water recirculated through a conduit 75, that will be combined with the main circulation in the first treatment section 3.2 and removed therefrom from the ammonia-lean wash water outlet 3.8.

Ammonium sulfate is removed through a waste water discharge duct shown at 37 in FIG. 1. After extraction of the waste water at 37, the pH of the ammonia-lean water can be further adjusted by adding a suitable acid at 39 (FIG. 1) to allow the use of the ammonia-lean hot water stream in the direct contact heater 13, as described below in more detail.

As mentioned above, after stripping ammonia from the ammonia-rich, preheated wash water in the first treatment section (stripping section) 3.2, the flue gas flows through the second treatment section 3.3, where the flue gas is cooled down by direct contact with chilled water, until reaching the temperature level required for operation of the carbon dioxide absorber 5.

In the second treatment section (cooling section) 3.3 also the main condensation of the water contained in the wet flue gas takes place. During water condensation, ammonia (stripped by the flue gas in the stripping section 3.2) and $CO_2$ are absorbed in the condensed water. Ammonia and $CO_2$ react to form ammonium carbonates and bicarbonates, which are removed from the direct contact cooler 3 along with the hot chilled water stream through the chilled water outlet 3.10.

In embodiments, control over the formation of ammonium carbonate in the condensing water stream in the second treatment section 3.3 of the direct contact cooler 3 is achieved as follows. Water containing ammonium carbonates (including ammonium carbonate and/or ammonium bicarbonate) collected at the bottom of the second treatment section (cooling section) 3.3 is cooled back and recirculated. The surplus water that has formed during condensation, rich in carbonates and $NH_3$, is separated from the recirculation stream at 41. The surplus water containing high concentration of carbonates and $NH_3$ is fed through a conduit 43 to an ammonium carbonate separator 44, including a heater/evaporator 45, wherein heat Q from a suitable heat source (not shown) is delivered to provoke decomposition of ammonium carbonate and ammonium bicarbonate contained in the surplus water fed through conduit 43 into ammonia and carbon dioxide. These latter are easily separated from the water stream in a condenser or column with condenser system as part of unit 45 and delivered to the carbon dioxide absorber 5. More specifically, the ammonia-rich gas stream is used in the carbon dioxide absorber 5 to form solvent for $CO_2$ capture. In some embodiments, the ammonia and carbon dioxide exiting the separator 44 are delivered through a conduit 46 to a second inlet 5.2 of the carbon dioxide absorber 5.

In other embodiments, the vapor phase (ammonia and carbon dioxide) exiting the heater/separator 45 can be delivered to the direct contact cooler 3.

The ammonium carbonate-lean surplus water from separator 44 is returned to the third inlet 3.6 (conduit 75) and mixed with the ammonia-rich water stream feeding the first treatment section (stripping section) 3.2. This minimizes the heat Q required in heater 31 for preheating the ammonia-rich wash water stream fed to the third inlet 3.6. Furthermore, addition of the surplus water to the preheated ammonia-rich water stream keeps the overall salt content in the water circulation system low.

As mentioned, the cooled flue gas loaded with ammonia in the second treatment section 3.3 of the direct contact cooler 3 is subjected to $CO_2$ removal in the carbon dioxide absorber 5. The ammonia-rich flue gas stream exiting the direct contact cooler 3 at 3.5, wherefrom contaminants such as SOx and the majority of water have been removed in the second treatment section 3.3, is delivered through duct 17 to a flue gas inlet 5.1 of the carbon dioxide absorber 5 and contacted with regenerated ammonia-rich water.

More specifically, a $CO_2$-lean ammonia-based solution from regenerator 7 is brought into countercurrent contact with the flue gas to absorb gaseous $CO_2$ from the flue gas stream to form a $CO_2$-lean flue gas collected at the top of the carbon dioxide absorber 5, and a $CO_2$-rich ammoniated solution or slurry collected at the bottom of the carbon dioxide absorber 5. The ammonia-based solution thus acts as a sorbent with respect to the carbon dioxide contained in the flue gas stream entering the carbon dioxide absorber 5 from the direct contact cooler 3.

The carbon dioxide absorber 5 is fluidly coupled to the regenerator 7 through conduits 47 and 49. More specifically, the conduit 47 is fluidly coupled to a carbon dioxide outlet 5.4 at the bottom of the carbon dioxide absorber 5, and the conduit 49 is fluidly coupled to an ammonia inlet 5.5 at the top of the carbon dioxide absorber 5. $CO_2$-rich ammonia-based solution exiting the carbon dioxide absorber 5 at the bottom through the carbon dioxide outlet 5.4 is fed through conduit 47 to the regenerator 7 and regenerated therein. $CO_2$-lean ammonia-based solution fed by duct 49 from the regenerator 7 is fed on top of the carbon dioxide absorber 5 through ammonia inlet 5.5.

In the regenerator 7 the $CO_2$-rich ammonia-based solution is regenerated using heat Q from a heat source (not shown), for instance delivered using steam or another heat transfer fluid. Carbon dioxide is thus separated from the ammoniated solution and evaporates from therefrom, and is collected at the top of the regenerator 7.

The $CO_2$-lean regenerated ammoniated solution is fed back through conduit 49 to the carbon dioxide absorber 5. A heat recuperator 51 is provided for recovering heat from the regenerated $CO_2$-lean ammonia-based solution flowing in conduit 49 and preheating the $CO_2$-rich ammoniated solution flowing through conduit 47, thus reducing the amount of heat Q that shall be provided to the regenerator 7 in order to regenerate the ammoniated solution.

The $CO_2$-rich gas stream exiting the regenerator 7 at the top thereof is delivered through a conduit 53 to the $CO_2$ wash station 9 to remove residual ammonia therefrom. The $CO_2$-rich gas stream flowing through the $CO_2$ wash station 9 is contacted and washed with a portion of washing solution delivered from the water wash station 11 through a conduit 57. In the $CO_2$ wash station 9 ammonia, which may have slipped out of the regenerator 7 via the $CO_2$-rich gas stream, is removed from the $CO_2$ gas stream and captured by the washing solution and finally returned to the direct contact cooler 3 through a conduit 59. Clean $CO_2$ is collected at the top of the $CO_2$ wash station 9 in a conduit 61 and delivered to a storage system (not shown) or other facility.

After $CO_2$ removal, the $CO_2$-lean, ammonia-rich flue gas stream exiting the carbon dioxide absorber 5 through a flue gas outlet 5.3 is delivered to the water wash station 11 through a conduit 63 to remove ammonia therefrom before discharging the flue gas in the atmosphere. $CO_2$-lean, ammonia-rich flue gas stream from the carbon dioxide absorber 5 enters the water wash station 11 through a flue gas inlet 11.1. In the water wash ($NH_3$ wash) station 11 the flue gas stream is brought in contact with a low-temperature circulating water stream that exits the water wash station 11 from the top thereof to enter the direct contact heater 13.

The majority of the water used in the water wash station 11 is fed from the direct contact heater 13 through a conduit 65. In embodiments, the conduit 65 can include a refrigerant driven chiller 67 to bring the wash water at the desired temperature, e.g. around 5-10° C., to perform removal of residual ammonia from the $CO_2$-lean, ammonia-lean flue gas stream flowing from the carbon dioxide absorber 5 through the water wash station 11.

The water circulating in the water wash station 11 absorbs the majority of the ammonia present in the flue gas delivered to the water wash station 11 from carbon dioxide absorber 5. The cold, ammonia-rich water is collected at the bottom of the water wash station 11 and exits the water wash station 11 through an outlet 11.2 and is fed through conduits 69 and 70 through inlet 3.6 to the first treatment section 3.2 of the direct contact cooler 3. In addition to the ammonia-rich water from the water wash station 11, further ammonia-rich water coming from the $CO_2$ wash station 9 through conduit 59 is fed to the first treatment section 3.2 of the direct contact cooler 3.

Prior to entering the first treatment section 3.2, ammonia-rich water from conduits 59, 69 and 70 is preheated in the heat exchanger 25. Here the ammonia-rich water is heated up by exchanging heat against the chilled water circulating in the second treatment section 3.3 of the direct contact cooler 3. Refrigeration duty used to cool down the wash water in the chiller 67 is thus recovered. The heated ammonia-rich water is then mixed in 74 with the ammonium carbonate-lean surplus water recovered through conduit 75 from the separator 44, and finally routed through conduit 33 and heater 31 to the first treatment section (stripping section) 3.2 of the direct contact cooler 3 to provide the required ammonia to be stripped by the flue gas stream 19.

If required, a portion of the ammonia-rich water from conduit 70 can be returned through a conduit 72 to refrigerant driven chiller 67 and therefrom to the water wash station 11, reducing the ammonia-rich water flowrate to the first treatment section 3.2 of the direct contact cooler 3.

In order to limit the ammonia concentration in the flue gas leaving the system 1, and thus to cope with the stringent requirements on reduction of ammonia release in the environment, according to the present disclosure ammonia is removed from the flue gas not only in the water wash station 11, but also in the direct contact heater 13 as follows.

In the direct contact heater 13 the flue gas, returning from $CO_2$ abatement (carbon dioxide absorber 5) and first ammonia removal at low temperature (water wash station 11), is heated up by direct contact heat exchange against the ammonia-lean hot water returned through conduit 35 from the direct contact cooler 3. The water returned from the bottom of the direct contact cooler 3 to the top of the direct contact heater 13 may have a temperature around 55-60° C. In this way a considerable amount of water condensed in the upper section 3.3 of the direct contact cooler 3 is re-evaporated.

Moreover, due to the low pH of the water returned from the direct contact cooler 3 to the direct contact heater 13, which has been achieved by acid dosing at 36 and 39 as described above, the water entering the direct contact heater 13 at the top thereof is also removing remaining ammonia from the flue gas that has not yet been removed in the water wash station 11. Proper pH adjustment of the water entering the direct contact heater 13 is a useful factor in controlling the free ammonia present in the water and thus finally controls the ammonia content in the flue gas before release thereof to atmosphere through a stack 81.

Removal through conduit 43 of any volatile salts, such as ammonium carbonate and bicarbonate, present in the water added to the circulation system is another useful factor not only contributing to ammonia stripping in the stripping section 3.2 and flue gas polishing performance, but also minimizing sulfuric acid consumption.

Problems from high salt concentrations in the circulating water streams, like precipitation on packings in the columns or the like, are avoided or substantially reduced by adding the surplus water.

In case the ammonium sulfate exiting at 37 shall be separated as a by-product, existing solutions are established and a combination of the prior art the system according to the present disclosure is possible. This may require the addition of a circulation loop for the direct contact heater 13 and a column system for the waste water stream replacing or in parallel to the evaporator/condenser installation described before.

The water management described above covers balancing of the water coming in with the flue gas, water entrainment into the carbon dioxide absorber 5, surplus/waste water control in the direct contact cooler 3 and water pick-up by the flue gas in the direct contact heater 13. This gives the opportunity to set the process conditions such that an appendix stripper foreseen in the CAP according to the current art can be omitted.

The non-volatile and low-volatility trace contaminants and associated salts management covers control of the salt, solid and trace concentrations in the circulating water, as well as adsorption control between stripping section 3.2 and cooling section 3.3 of the direct contact cooler 3. Operating below the solubility equilibrium of the salt increases the reliability and availability of the system. Furthermore, the process is able to fulfill the strictest regulations regarding ammonia emissions.

Carbonic ammonium salts management covers the control over the respective salt formation between stripping section 3.2 and cooling section 3.3 of the direct contact cooler 3, as well as the salt carryover via the surplus water stream. This minimizes the required acid dosing and thus reduces also the salt freight of the waste water.

The thorough application of all of the above described operation management steps allows to omit the installation of a conventional stripper column system, where the reboiler usually requires up to 40% of the total process heat demand. The heat demand of the system according to the present disclosure could be reduced to 10% or less of the total heat demand needed for the whole $CO_2$ abatement system. This is a major improvement in CAP performance.

The new arrangement of the first and second treatment sections 3.2 and 3.3 of the direct contact cooler 3 results in a more efficient design of the remaining circuitry of the system 1, inasmuch for instance only one water circuit is needed, instead of two, as in other prior art systems.

Figure 3:
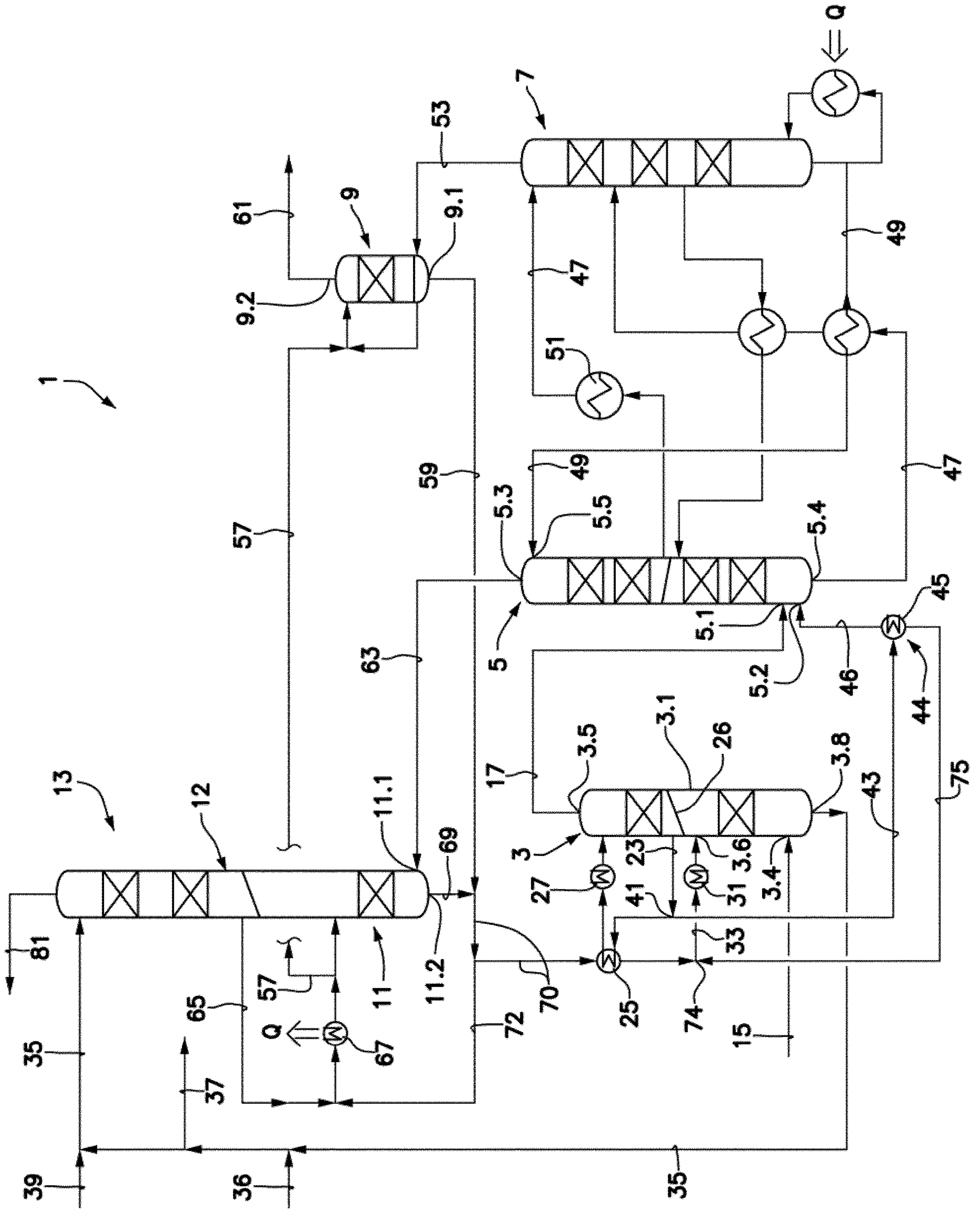
FIG. 3 is a schematic diagram of an ammonia-based carbon dioxide removal system according to the present disclosure using a mixed salt process (MSP).

As mentioned, while the system 1 of FIG. 1 is based on the Chilled Ammonia Process, novel aspects of the present disclosure can be embodied in a different ammonia-based carbon dioxide abatement process, such as a mixed salt process (MSP), for instance. FIG. 3 illustrates a schematic of an ammonia-based carbon dioxide removal or abatement system using the mixed salt process, modified according to the present disclosure. The same reference numbers indicate the same or corresponding parts and elements shown in FIG. 1 and described above. Specifically, the system of FIG. 3 differs from the system of FIG. 1 mainly for the different nature of the ammonia-based solution used in the absorber 5 and regenerated in the regenerator 7. A slightly amended layout of the carbon dioxide absorber 5 and regenerator 7 is shown in FIG. 3, adapted for the use with a mixed salt process.

With the direct contact cooler and relevant carbon dioxide removal system and method according to the embodiments disclosed herein, a reduction of heat consumption is achieved, compared with systems and methods of the current art. Specifically, ammonia stripping is performed using heat contained in the flue gas, thus reducing the need to provide heat to the system, since the ammonia stripping step is performed upstream of the flue gas chilling step in the direct contact cooler.

Moreover, in addition to an improved energy balance, the system is simpler and requires a reduced number of components if compared with the prior art systems and methods. Not only an ammonia stripping column is dispensed with, as stripping is performed in the direct contact cooler, as disclosed in prior art references mentioned in the introductory part of the present description. Also a substantial saving in terms of structural components is achieved with respect to the most efficient prior art systems, as for instance a single water circuit is required, instead of two.

Exemplary embodiments have been disclosed above and illustrated in the accompanying drawings. It will be understood by those skilled in the art that various changes, omissions and additions may be made to that which is specifically disclosed herein without departing from the scope of the invention as defined in the following claims.

The invention claimed is:

1. An ammonia-based carbon dioxide abatement system comprising:
- a direct contact cooler, comprising:
  - a flue gas stream path extending from a flue gas inlet to a flue gas outlet;
  - a first treatment section and a second treatment section disposed along the flue gas stream path; and
  - a wash water inlet and a wash water outlet,
- a carbon dioxide absorber disposed downstream of and fluidly coupled to the direct contact cooler, the carbon dioxide absorber having a flue gas inlet and a flue gas outlet;
- a water wash station fluidly coupled through a flue gas inlet to the carbon dioxide absorber and adapted to absorb ammonia slip from flue gas; and
- a heater connected to the first wash water inlet of the direct contact cooler and adapted to heat wash water delivered from the water wash station to the direct contact cooler,
- wherein the carbon dioxide absorber is adapted to absorb gaseous carbon dioxide from flue gas entering the carbon dioxide absorber from the direct contact cooler via an ammonia-based solution to form an ammonia-based solution exiting the carbon dioxide absorber through a carbon dioxide outlet;
- wherein the first treatment section is arranged upstream of the second treatment section with respect to the flue gas stream path,
- wherein the wash water inlet is disposed between the first treatment section and the second treatment section, and
- wherein the wash water outlet is disposed upstream of the first treatment section.

2. The system of claim 1, wherein the first treatment section and the second treatment section are arranged in a column with the second treatment section being positioned on top of the first treatment section.

3. The system of claim 1, wherein the second treatment section is adapted to circulate chilled water in counter flow with respect to the flue gas stream in the flue gas stream path.

4. The system of claim 3, further comprising:
- a circulating duct; and
- a refrigeration arrangement is arranged along the circulating duct and adapted to remove heat from the circulating chilled water,
- wherein the chilled water inlet is fluidly coupled to the circulating duct.

5. The system of claim 3, further comprising:
- a chilled water collection device arranged between the first treatment section and the second treatment section and adapted to collect chilled water and ammonium carbonate from the second treatment section, to deliver the collected chilled water and ammonium carbonate towards the chilled water outlet, and to allow flue gas to flow therethrough from the first treatment section to the second treatment section.

6. The system of claim 1, further comprising:
- a direct contact heater adapted to receive flue gas from the water wash station,
- wherein the water wash station is fluidly coupled with the direct contact heater.

7. The system of claim 6, wherein the water wash station and the direct contact heater are integrated in a single column, and wherein the water wash station is arranged in a bottom section of the column and the direct contact heater is arranged in a top section of the column.

8. The system of claim 6, wherein the direct contact cooler is further fluidly coupled to the direct contact heater through the wash water outlet so that wash water from the direct contact cooler is delivered to the direct contact heater, and wherein the direct contact heater is adapted to heat the flue gas by direct contact heat exchange with the wash water from the direct contact cooler.

9. The system of claim 8, further comprising:
- a connecting duct fluidly coupling the wash water outlet of the direct contact cooler to the direct contact heater; and
- an acid inlet arranged along the connecting duct; and
- an ammonium sulfate discharge duct downstream of the acid inlet.

10. The system of claim 1, wherein the direct contact cooler is further fluidly coupled to the water wash station to receive wash water therefrom through the wash water inlet.

11. The system of claim 1, further comprising:
- a heat exchanger adapted to transfer heat from chilled water circulating in the second treatment section of the direct contact cooler to wash water flowing from the water wash station to the direct contact cooler.

12. The system of claim 1, further comprising:
- a regenerator fluidly coupled to the carbon dioxide absorber and adapted to receive the ammonia-based solution exiting the carbon dioxide absorber to separate carbon dioxide therefrom, and to return the ammonia-based solution to the carbon dioxide absorber.

13. The system of claim 12, further comprising:
- a $CO_2$ wash station having a carbon dioxide inlet fluidly coupled to the regenerator to receive carbon dioxide therefrom and a carbon dioxide outlet adapted to discharge carbon dioxide therefrom,
- wherein the $CO_2$ wash station is adapted to receive water from the direct contact heater, to remove residual ammonia from the carbon dioxide flowing through the $CO_2$ wash station, and
- wherein the $CO_2$ wash station includes an ammoniated water outlet fluidly coupled with the ammonia-rich wash water inlet of the direct contact cooler.

14. The system of claim 1, further comprising:
- a regenerator fluidly coupled to the carbon dioxide absorber and adapted to receive a first ammonia-based solution exiting the carbon dioxide absorber to separate carbon dioxide therefrom and to return a second ammonia-based solution to the carbon dioxide absorber,
- wherein the ammonium carbonate separator has a vapor outlet fluidly coupled to the regenerator adapted to return a gas stream to the regenerator.

15. An ammonia-based carbon dioxide abatement system comprising:
- a direct contact cooler, comprising:
  - a flue gas stream path extending from a flue gas inlet to a flue gas outlet;
  - a first treatment section and a second treatment section disposed along the flue gas stream path;
  - a chilled water outlet; and
  - a wash water inlet and a wash water outlet,
- a carbon dioxide absorber disposed downstream of and fluidly coupled to the direct contact cooler, the carbon dioxide absorber having a flue gas inlet and a flue gas outlet;
- a water wash station fluidly coupled through a flue gas inlet to the carbon dioxide absorber and adapted to absorb ammonia slip from flue gas; and an ammonium carbonate separator fluidly coupled with the chilled water outlet and adapted to receive a side stream of ammonium-carbonates loaded water from the chilled water outlet of the direct contact cooler and to decompose ammonium carbonates into ammonia and carbon dioxide, wherein the carbon dioxide absorber is adapted to absorb gaseous carbon dioxide from flue gas entering the carbon dioxide absorber from the direct contact cooler via an ammonia-based solution to form an ammonia-based solution exiting the carbon dioxide absorber through a carbon dioxide outlet;

wherein the first treatment section is arranged upstream of the second treatment section with respect to the flue gas stream path, wherein the wash water inlet is disposed between the first treatment section and the second treatment section, and wherein the wash water outlet is disposed upstream of the first treatment section.

16. The system of claim 15, wherein the ammonium carbonate separator has a water outlet fluidly coupled to the wash water inlet of the direct contact cooler to return water from the ammonium carbonate separator to the direct contact cooler.

17. The system of claim 15, wherein the ammonium carbonate separator has a vapor outlet to return a gas stream to carbon dioxide absorber or to the direct contact cooler.

* * * * *